US005729977A

United States Patent [19]

Zibble et al.

[11] Patent Number: 5,729,977

[45] Date of Patent: Mar. 24, 1998

[54] EXHAUST COLLECTOR FOR PNEUMATIC TOOL

[75] Inventors: Brian Neil Zibble, Saginaw; Robert Frank Hack, Bay City; Donald Phillip Block, St. Charles; Thomas Alan Haynes, Saginaw, all of Mich.

[73] Assignee: General Motors Corporation, Detroit, Mich.

[21] Appl. No.: 761,917

[22] Filed: Dec. 9, 1996

[51] Int. Cl.$^6$ ........ F16D 31/02

[52] U.S. Cl. ........ 60/407

[58] Field of Search ........ 60/370, 407, 410, 60/409

[56] References Cited

U.S. PATENT DOCUMENTS

| | | | |
|---|---|---|---|
| 1,613,172 | 1/1927 | Jasper . | |
| 2,950,775 | 8/1960 | Zwayer | 181/36 |
| 3,880,245 | 4/1975 | Anderson, Jr. | 173/163 |
| 3,963,391 | 6/1976 | Thorburn et al. | 418/270 |
| 3,989,113 | 11/1976 | Spring, Sr. et al. | 173/163 |
| 4,210,975 | 7/1980 | Teague, Jr. et al. | 15/22 R |
| 4,213,301 | 7/1980 | Maier et al. | 60/407 |
| 4,404,799 | 9/1983 | Dudek | 60/370 |
| 5,069,028 | 12/1991 | Kakuda et al. | 60/407 |
| 5,243,761 | 9/1993 | Sullivan et al. | 60/407 X |

*Primary Examiner*—Hoang Nguyen
*Attorney, Agent, or Firm*—Saul Schwartz

[57] ABSTRACT

An exhaust collector for a pneumatic tool having a cylindrical body with a rotary driver at one end, an inlet port and an exhaust port for motive fluid at the other end, and a switch on the side of the cylindrical body which actuates a valve to turn the pneumatic tool on and off. The exhaust collector includes a tubular adapter on the cylindrical body defining an extension of the inlet port, a cup-shaped shroud clamped to the cylindrical body and cooperating therewith in defining a closed exhaust plenum around the tubular adapter, a first quick-connect fluid coupling on the shroud in flow communication with the tubular adapter for coupling to the inlet port a hose connected to a source of motive fluid, and a second quick-connect fluid coupling on the shroud in flow communication with the exhaust plenum for coupling to the exhaust plenum a hose connected to a remote exhaust diffuser. In a preferred embodiment, outside screw threads on the tubular adapter cooperate with inside screw threads in a bore in the cup-shaped shroud to clamp the shroud against the cylindrical body of the pneumatic tool.

3 Claims, 3 Drawing Sheets

EXHAUST COLLECTOR FOR PNEUMATIC TOOL

TECHNICAL FIELD

This invention relates to an exhaust collector for a pneumatic tool.

BACKGROUND OF THE INVENTION

A common pneumatic tool has a cylindrical body, a rotary driver at one end, inlet and exhaust ports for motive fluid at the other end, and a switch on the side of the cylindrical body which turns the pneumatic tool on and off by actuating a valve which opens and closes a motive fluid flow path from the inlet port to the exhaust port through a fluid motor in the cylindrical body. A quick-connect coupling for coupling the inlet port of the pneumatic tool to a hose connected to a source of motive fluid is screwed into the inlet port. The exhaust port consists of a plurality of ports in the end of the cylindrical body around the inlet port from which streams of gaseous exhaust issue when the pneumatic tool is on. It is known to drape a cloth over the exhaust ports of the pneumatic tool to diffuse the gaseous streams and, alternatively, to attach a simple baffle to the cylindrical body of the pneumatic tool to prevent direct impingement of the exhaust streams on an operator of the tool. Such expedients, while effective, are not fully satisfactory.

SUMMARY OF THE INVENTION

This invention is a new and improved exhaust collector for a pneumatic tool having a cylindrical body, a rotary driver at one end, an inlet port and an exhaust port for motive fluid at the other end, and a switch on the side of the cylindrical body which actuates a valve to turn the pneumatic tool on and off by opening and closing a motive fluid flow path from the inlet port to the exhaust port through a fluid motor in the cylindrical body. The exhaust collector includes a tubular adapter on the cylindrical body defining an extension of the inlet port of the pneumatic tool, a cup-shaped shroud clamped to the cylindrical body and cooperating therewith in defining a closed exhaust plenum around the tubular adapter, a first quick-connect fluid coupling on the shroud in flow communication with the tubular adapter for coupling to the inlet port of the pneumatic tool a hose connected to a source of motive fluid, and a second quick-connect fluid coupling on the shroud in flow communication with the exhaust plenum for coupling to the exhaust plenum a hose connected to a remote exhaust diffuser. In a preferred embodiment, outside screw threads on the tubular adapter cooperate with inside screw threads in a bore in the cup-shaped shroud to clamp the shroud against the cylindrical body of the pneumatic tool when the shroud is rotated relative to the tubular adapter.

DESCRIPTION OF PRIOR ART

Figure 1:
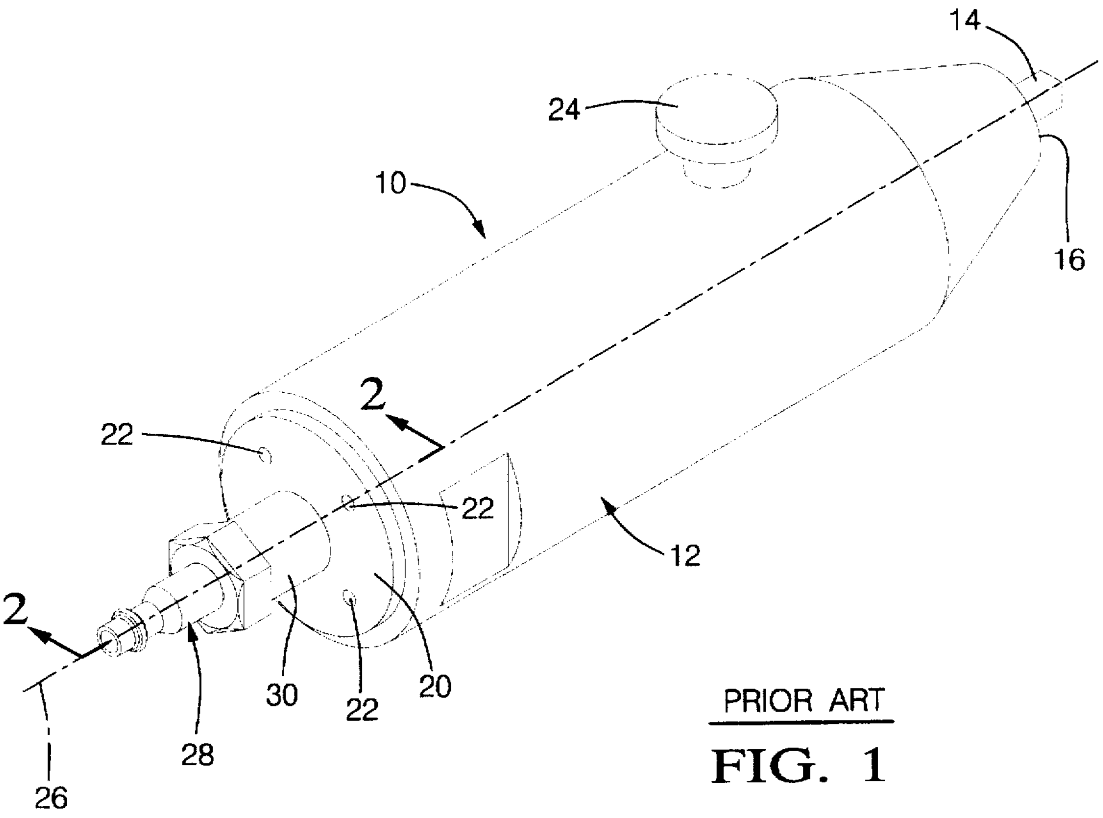
PRIOR ART FIG. 1
FIG. 1 is a perspective view of a prior art pneumatic tool.
Figure 2:
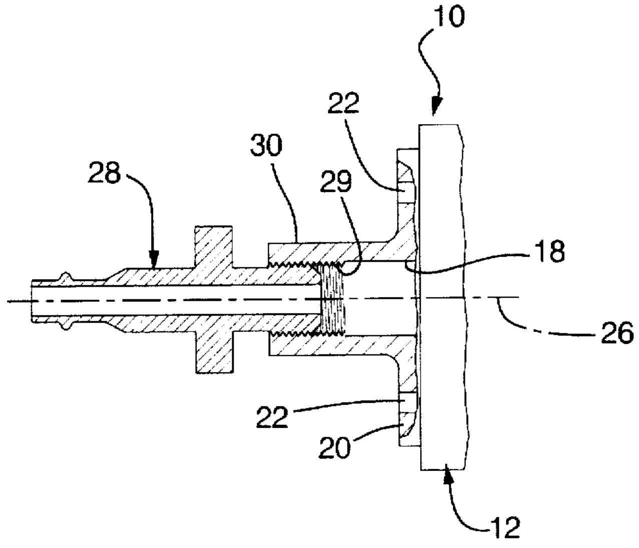
PRIOR ART FIG. 2
FIG. 2 is a sectional view taken generally along the plane indicated by lines 2—2 in FIG. 1.

Referring to FIGS. 1–2, a common pneumatic tool 10 has a cylindrical body 12, a driver 14 at first end 16 of the cylindrical body, an inlet port 18 in the middle of a second end 20 of the cylindrical body, a plurality of exhaust ports 22 in the second end 20 of the cylindrical body arrayed around the inlet port, and a switch 24 on the side of the cylindrical body which actuates a valve, not shown, to turn the pneumatic tool on and off. When the pneumatic tool is on, a motive fluid flow path is open from the inlet port 18 to the exhaust ports 22 through a fluid motor, not shown, in the cylindrical body 12 which rotates the driver 14 about a longitudinal centerline 26 of the pneumatic tool. When the pneumatic tool is off, the aforesaid motive fluid flow path is blocked.

A quick-connect fluid coupling 28 for coupling the pneumatic tool 10 to a hose, not shown, connected to a source of motive fluid, e.g., an air compressor, is screwed into an inside screw thread 29 in an integral tubular boss 30 of the cylindrical body 12 perpendicular to the end 20 of the cylindrical body around the inlet port 18. When the pneumatic tool is on, streams of gaseous exhaust issue from the exhaust ports 22 parallel to the longitudinal centerline 26 of the pneumatic tool. It is known to drape a cloth, not shown, over the exhaust ports 22 to diffuse the gaseous streams issuing from the exhaust ports and, alternatively, to attach a simple baffle, not shown, to the cylindrical body 12 to prevent direct impingement of gaseous exhaust streams on an operator.

DESCRIPTION OF THE PREFERRED EMBODIMENT

Figure 3:
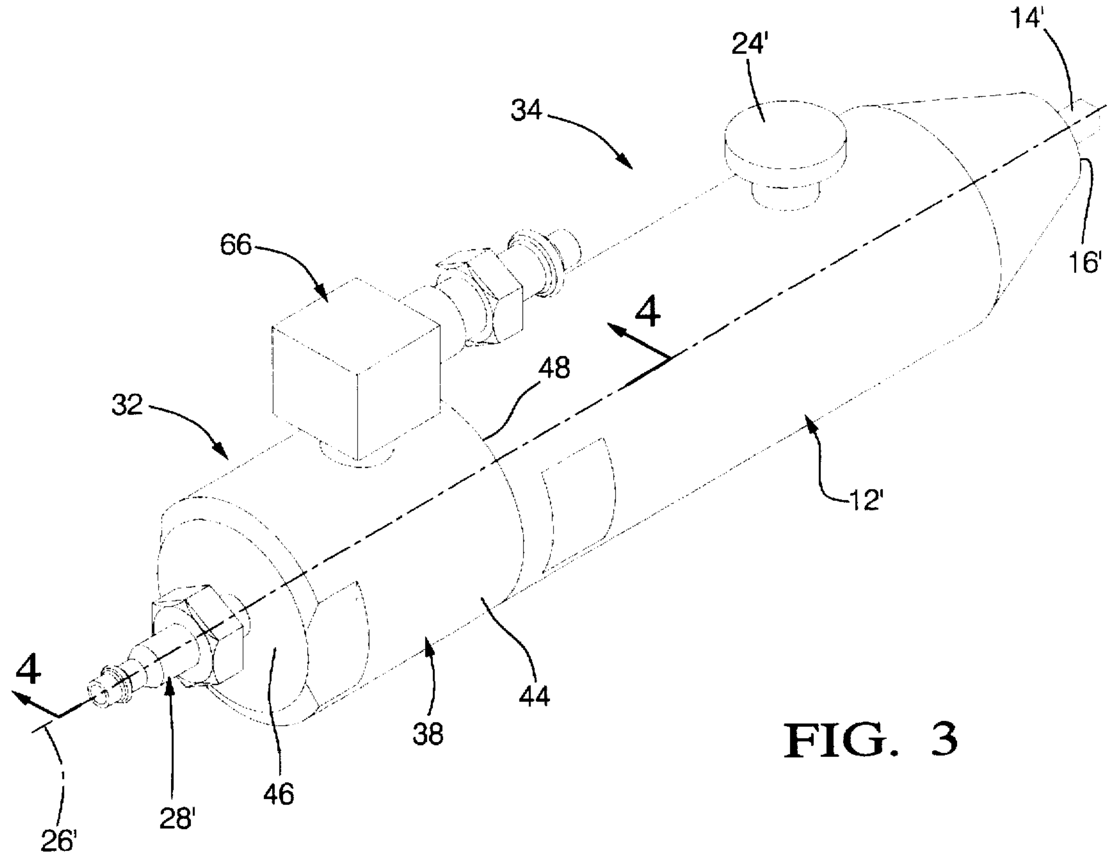
FIG. 3 is a perspective view of the prior art pneumatic tool illustrated in FIG. 1 having an exhaust collector according to this invention thereon.
Figure 4:
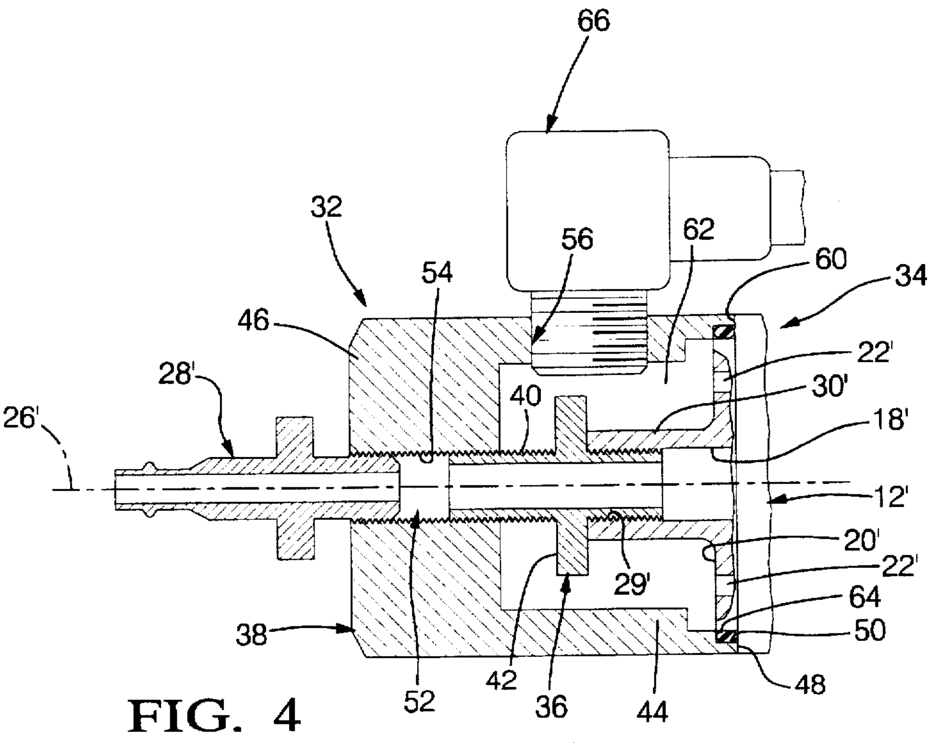
FIG. 4 is a sectional view taken generally along the plane indicated by lines 4—4 in FIG. 3.
Figure 5:
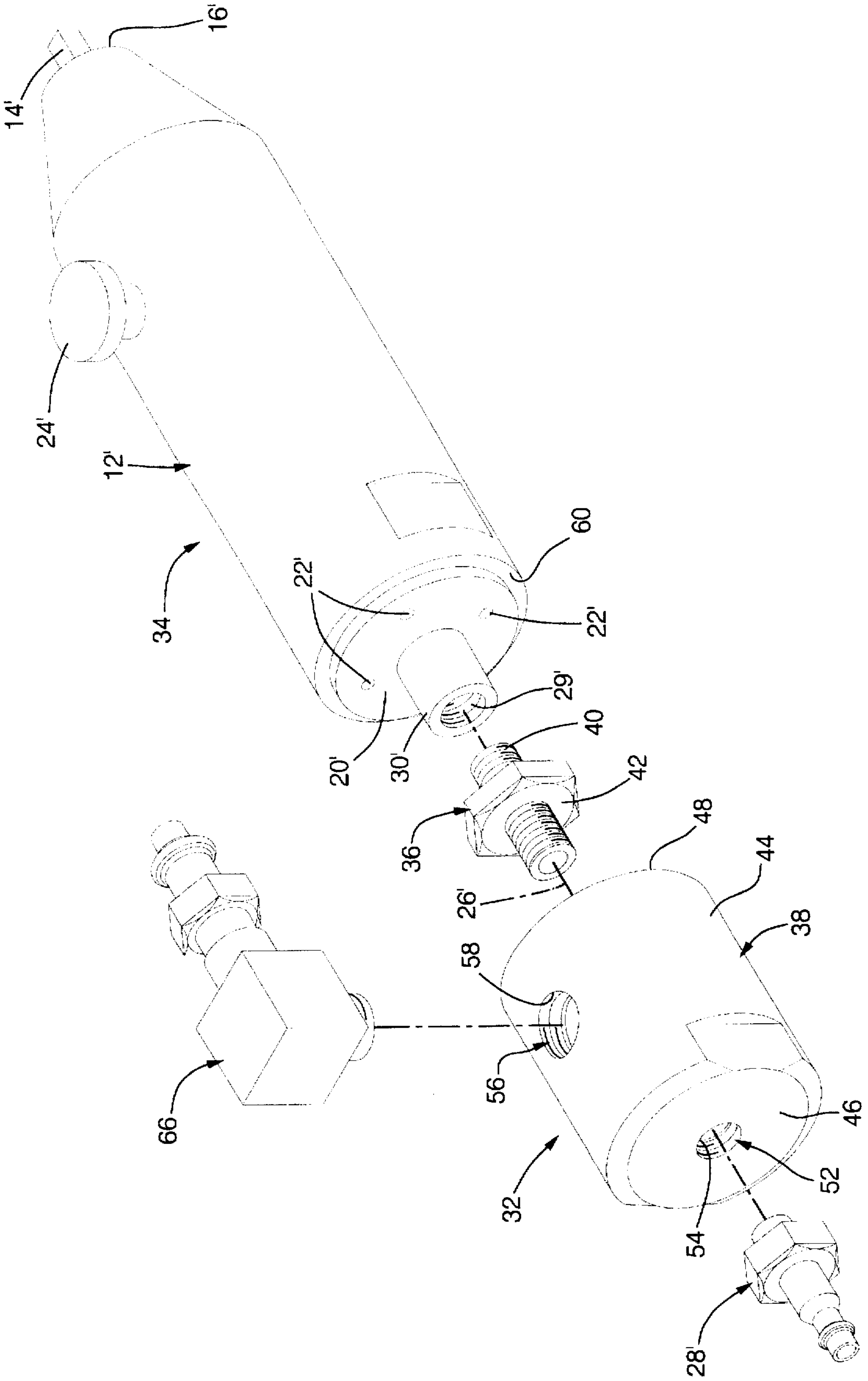
FIG. 5 is an exploded perspective view of the exhaust collector according to this invention.

An exhaust collector 32 according to this invention is illustrated in FIGS. 3–5 on a pneumatic tool 34 substantially like the pneumatic tool 10 described above. Structural features common to both of the pneumatic tools 10,34 are identified by primed reference characters in FIGS. 3–5. The pneumatic tool 34 includes a cylindrical body 12', a driver 14' at first end 16' of the cylindrical body, an inlet port 18' in the middle of a second end 20' of the cylindrical body surrounded by an integral tubular boss 30' of the cylindrical body, a plurality of exhaust ports 22' in the second end 20' of the cylindrical body arrayed around the tubular boss 30', and a switch 24' on the side of the cylindrical body which actuates a valve, not shown, to turn the pneumatic tool on and off. When the pneumatic tool is on, a motive fluid flow path is open from the inlet port 18' to the exhaust ports 22' through a fluid motor, not shown, in the cylindrical body which rotates the driver 14' about a longitudinal centerline 26' of the pneumatic tool. When the pneumatic tool is off, the aforesaid flow path is blocked.

The exhaust collector 32 includes a tubular adapter 36 and a cup-shaped shroud 38. The tubular adapter 36 has an outside screw thread 40 thereon and a hex-shaped flange 42. The tubular adapter 36 defines a hollow mounting stud on the second end 20' of the cylindrical body 12' aligned on the centerline 26' of the pneumatic tool and in flow communication with the inlet port 18' of the latter when the outside screw thread 40 is received in an inside screw thread 29' in the tubular boss 30' and tightened by a wrench, not shown, on the hex-shaped flange 42.

The cup-shaped shroud 38 includes a relatively thin cylindrical wall 44 and an integral, relatively thick circular base 46. An exposed circular edge 48 of the cylindrical wall 44 has an annular groove 50 therein facing the center of the shroud. A bore 52 through the middle of the circular base 46 perpendicular to the plane thereof has an inside screw thread 54 which matches the outside screw thread 40 on the tubular adapter 36. A bore 56 through the cylindrical wall 44 has an inside screw thread 58.

The cup-shaped shroud 38 is rigidly attached to the cylindrical body 12' of the pneumatic tool 34 by screw threading the inside screw thread 54 in the bore 52 onto the outside screw thread 40 on the hollow mounting stud on the cylindrical body 12' defined by the tubular adapter 36 and rotating the shroud about the longitudinal centerline 26' of the pneumatic tool until the circular edge 48 butts tightly against an annular land 60 on the end 20' of the cylindrical body. The shroud 38 cooperates with the end 20' of the cylindrical body 12' in defining a closed exhaust plenum 62, FIG. 4, exposed to the exhaust ports 22' but isolated from the inlet port 18' by the tubular adapter 36. A seal ring 64 in the annular groove 50 seals the interface between the cylindrical wall 44 of the shroud and the end 20' of the cylindrical body 12' of the pneumatic tool.

A first quick-connect fluid coupling 28' for coupling the pneumatic tool 34 to a hose, not shown, connected to a source of motive fluid, e.g., an air compressor, is screwed into the inside screw thread 54 in the bore 52 in the circular end 46 of the shroud 38 from outside of the shroud and is in flow communication with the inlet port 18' of the pneumatic tool through the bore 52 and through the tubular adapter 36. A second quick-connect fluid coupling 66 for coupling the pneumatic tool 34 to a hose, not shown, connected to a remote exhaust diffuser is screwed into the inside screw thread 58 in the bore 56 in the cylindrical wall 44 of the shroud 38 from outside of the shroud and is in flow communication with the exhaust plenum 62. When the pneumatic tool is on, streams of gaseous exhaust issuing from the exhaust ports 22' are captured in the exhaust plenum 62 and ducted through the second quick-connect coupling 66 to the aforesaid remote diffuser.

We claim:

1. An exhaust collector for a pneumatic tool including a body, an inlet port in an end wall of said body, and an exhaust port in said end wall of said body, said exhaust collector comprising:

a tubular adapter rigidly attached to said pneumatic tool body in flow communication with said inlet port, a shroud sealed against said tubular adapter having a circular edge seated on said end wall of said pneumatic tool body so that said shroud cooperates with said end wall of said pneumatic tool body in defining a closed exhaust plenum exposed to said exhaust port and isolated from said inlet port by said tubular adapter, a clamp means between said shroud and said tubular adapter operative to clamp said circular edge of said shroud against said pneumatic tool body, a first fluid coupling means in flow communication with said inlet port through said tubular adapter for introducing motive fluid to said inlet port, and a second fluid coupling means in flow communication with said exhaust plenum for conducting exhausted motive fluid to a remote diffuser.

2. The exhaust collector recited in claim 1 wherein said clamp means operative to clamp said circular edge of said shroud against said pneumatic tool body comprises:

a bore in said base of said shroud having an inside screw thread therein, and an outside screw thread on said tubular adapter received in said inside screw thread in said bore in said base of said shroud.

3. The exhaust collector recited in claim 2 further comprising:

an elastomeric seal ring between said circular edge of said shroud and said end wall of said pneumatic tool body.

* * * * *